United States Patent [19]

Presby

[11] Patent Number: 4,672,198

[45] Date of Patent: Jun. 9, 1987

[54] SIGNAL SAMPLER MICROBENDING FIBER TEST CLIP

[75] Inventor: Herman M. Presby, Highland Park, N.J.

[73] Assignee: AT&T Company and AT&T Bell Laboratories, Murray Hill, N.J.

[21] Appl. No.: 822,141

[22] Filed: Jan. 24, 1986

[51] Int. Cl.⁴ ............................................. G01N 21/00
[52] U.S. Cl. .................................. 250/227; 356/73.1; 350/96.15
[58] Field of Search ....................... 250/227; 356/73.1; 350/96.15

[56] References Cited

U.S. PATENT DOCUMENTS

| | | | |
|---|---|---|---|
| 2,516,657 | 7/1950 | Spendlove | 173/273 |
| 3,864,629 | 2/1975 | Danna | 324/72.5 |
| 3,884,585 | 5/1975 | Lebduska | 356/239 |
| 4,253,727 | 3/1981 | Jeunhomme et al. | 350/96.15 |
| 4,270,839 | 6/1981 | Cross | 350/96.15 |
| 4,288,161 | 9/1981 | Fortescue | 356/73 |
| 4,477,725 | 10/1984 | Asawa et al. | 350/96.15 |

OTHER PUBLICATIONS

J. Acoust. Soc. Am., Mar. 1980, "Fiber Optic Pressure Sensor", Fields et al., pp. 816-818.
Catalog: Measuring Instruments for Optical Fiber Communic. Systems, 1985, Anritsu Electrical Co., Ltd., pp. 47-49.

Primary Examiner—David C. Nelms
Assistant Examiner—Jessica Ruoff
Attorney, Agent, or Firm—Daniel D. Dubosky; David R. Padnes

[57] ABSTRACT

The invention relates to a hand-held device for detecting whether or not an optical fiber is carrying a light signal. The device includes a spring loaded hook for grabbing an exposed optical fiber anywhere along its length, thereby introducing microbending, a photodetector for responding to the presence of light emitted in the proximity of the microbend, and a light emitting diode connected by way of an amplifier to the photodetector for indicating when a light signal has been detected. Upon release of the spring loaded hook, the fiber returns to its normal state. The device can be easily modified to indicate not only the presence of a light signal, but also the strength of the signal and the direction in which the signal is being transmitted.

8 Claims, 5 Drawing Figures

SIGNAL SAMPLER MICROBENDING FIBER TEST CLIP

TECHNICAL FIELD

This invention relates to apparatus for nondestructively detecting the presence or absence of signals in optical fiber systems.

DESCRIPTION OF THE PRIOR ART

Optical fibers in general are known in the art, and typically comprise a transparent core of a suitable glass or plastic material which is contained within a cylindrical cladding having an index of refraction less than the refractive index of the core. A plastic jacket or coating protects the fiber on the outside. When a light signal is focused upon one end of the fiber, the fiber core functions as a waveguide to transmit or propagate the light signal through the core with relatively small internal intensity losses and negligible transmission of the signal to the cladding. An important feature of this type of optical fiber is that gradual turns or bends in the fiber have little or no effect upon transmission of the light signal. Fiber optic cables may consist of a single fiber or many optical fibers. Each fiber is an independent optical waveguide in its operation by containing and transmitting signals completely, radiating virtually no external optical energy.

It is necessary in installing and/or servicing fiber-optic systems to be able to detect the presence or absence of a light signal on the fiber. This is analogous to detecting a current in a wire to see which circuit is "live". This requirement, of course, can be satisfied by having access to an end of the fiber. However, at intermediate locations on the fiber, an end is not available, nor is it desirable to break the fiber to see if it is guiding light. Thus, a noninvasive means for detecting signals is clearly desirable.

Various means for signal detection on optical fibers have been proposed. U.S. Pat. No. 3,884,585 issued May 20, 1975 to Lebduska, discloses a method of detecting broken fibers or filaments in a fiber-optic bundle. The procedure requires that individual bundles be removed and placed in a test fixture in which one end of the bundle is illuminated with a light source and the transmitted light emitting from the face of the receiving cable end is magnified. A second light is used to illuminate the surface of the receiving cable end in order to distinguish the faces of the broken fibers from the remaining background.

In U.S. Pat. No. 4,288,161 issued Sept. 8, 1981 to Fortescue, another type of optical probe is described. Fortescue's device detects transitory and repetitive light signals from a fiber-optic cable and provides audio or photometric output signals, thereby providing primarily a monitoring capability.

It has also been recognized that a microbend, which is a short bend having a period on the order of a few millimeters, results in an attenuation of the propagated light signal. This attenuation is a result of the scattering of a portion of the signal from the fiber core to the cladding. In some applications, this attenuation phenomenon is a useful characteristic. For example, in U.S. Pat. No. 4,253,727 issued Mar. 3, 1981 to Jeunhomme et al., an optical coupler is disclosed. This coupler induces one or more microbends into the fiber to extract a portion of the light signal therefrom, or to input an additional light signal into the fiber.

The concept of optical fiber microbending has also been proposed as a transducer mechanism. In this application, microbending causes a detectable attenuation of a light signal passing through the fiber, wherein the degree of attenuation indicates pressure and magnitude. The transducer mechanism senses and quantifies this pressure acting upon a physical structure. A microbend pressure transducer is further described in "Fiber Optic Pressure Sensor", Fields et al., *J. Acoust. Soc. Am.*, March, 1980, pp. 816–818.

U.S. Pat. No. 4,477,725 issued Oct. 16, 1984 to Asawa et al., describes an optical fiber and microbend transducer system for detecting the location and magnitude of forces acting along the length of a structure. A single remote monitoring station then monitors several of the microbend transducers simultaneously.

An optical fiber signal tapping assembly is disclosed in U.S. Pat. No. 4,270,839 issued June 2, 1981 to Cross. This assembly extracts a sample of an optical signal propagating through an optical fiber and is also capable of recognizing the direction of such propagation. For this assembly to be effective, the fiber must be modified by stripping part of the protective buffer coating. After bending the fiber and causing it to leak in a directional manner, the escaping signal energy is captured in a light pipe rod which conducts the signal to a detector.

In general, the prior art devices for fault or signal detection in fiber-optic cables require removal of the cable from the system, or some type of modification of the fiber itself. The need exists for a device which detects the presence and certain characteristics of optical signals propagating along an optical fiber, that is relatively inexpensive, easy to assemble and manufacture, requires no modification of such fiber, avoids introduction of excessive loss in such fiber, and can be utilized with no or minimal disruption to the fiber-optic system.

SUMMARY OF THE INVENTION

In accordance with the present invention, a hand-held optical fiber test probe is provided wherein a spring loaded hook can be engaged to provide microbending in an optical fiber. A photodetector mounted in the test probe housing in the vicinity of the hook detects whether or not an optical signal is present in the fiber. The presence of the signal is indicated by a light emitting diode which is connected to receive a signal generated by the photodetector.

It is a feature of the present invention that both the presence and direction of the optical signal can be indicated by including an additional photodetector and light emitting diode combination in the test probe. It is another feature of the present invention that the strength of the optical signal can be indicated either by setting a threshold beyond which point the light emitting diode will be activated or by substituting a meter for the light emitting diode which measures the current generated when the photodetector detects an optical signal.

BRIEF DESCRIPTION OF THE DRAWING

In the accompanying drawings which illustrate the invention.

DETAILED DESCRIPTION

Figure 1:
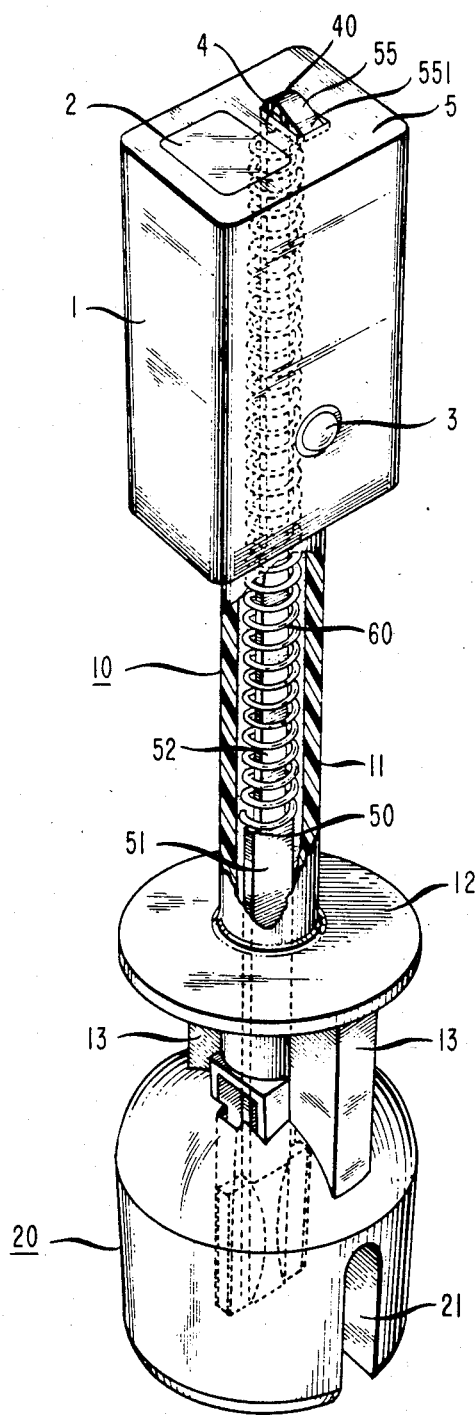
FIG. 1 is an enlarged perspective view of an optical fiber signal test clip, constructed according to the invention.

As shown in the drawings, and more specifically in FIG. 1, housing 10 comprises hollow tubular member 11 with an annular flange 12, guide members 13, and an end 1 which houses detection and output circuitry. Housing 10 slidably engages with cap 20 via guide members 13. Cap 20 may include a hole 21 through which an electrical power lead may be inserted and connected through housing 10 to circuitry contained in housing end 1. In such a case, housing 10 and cap 20 may be composed of an electrically insulating material, to avoid unwanted electrical connections. Alternatively, power may be supplied directly to housing end 1 and the circuitry contained therein.

A shaft 50 is longitudinally reciprocable in housing 10, and is composed of two adjoining sections—a narrow section 52 and a wide section 51. An end of the wide section 51 is rigidly embedded in cap 20, preferably so that shaft 50 is thus located concentric therein as shaft 50 extends from cap 20 through housing 10. The narrow section 52 of shaft 50 extends through tubular member 11 and housing end 1 and contains a hook 55 on one end. Hook 55 protrudes outside of housing end 1 through opening 4 with edge 551 of hook 55 normally resting in a groove 40 on the surface of face 5 of end housing 1.

A coil spring 60 is received within housing 10 and encircles narrow section 52 of shaft 50. This spring 60 reacts between an inner surface of end housing 1 and the wide section 51 of shaft 50 with a predetermined force so as to result in the normal position of hook 55 with edge 551 in groove 40 on face 5 of end housing 1, as shown in FIG. 1 of the drawing.

Figure 2:
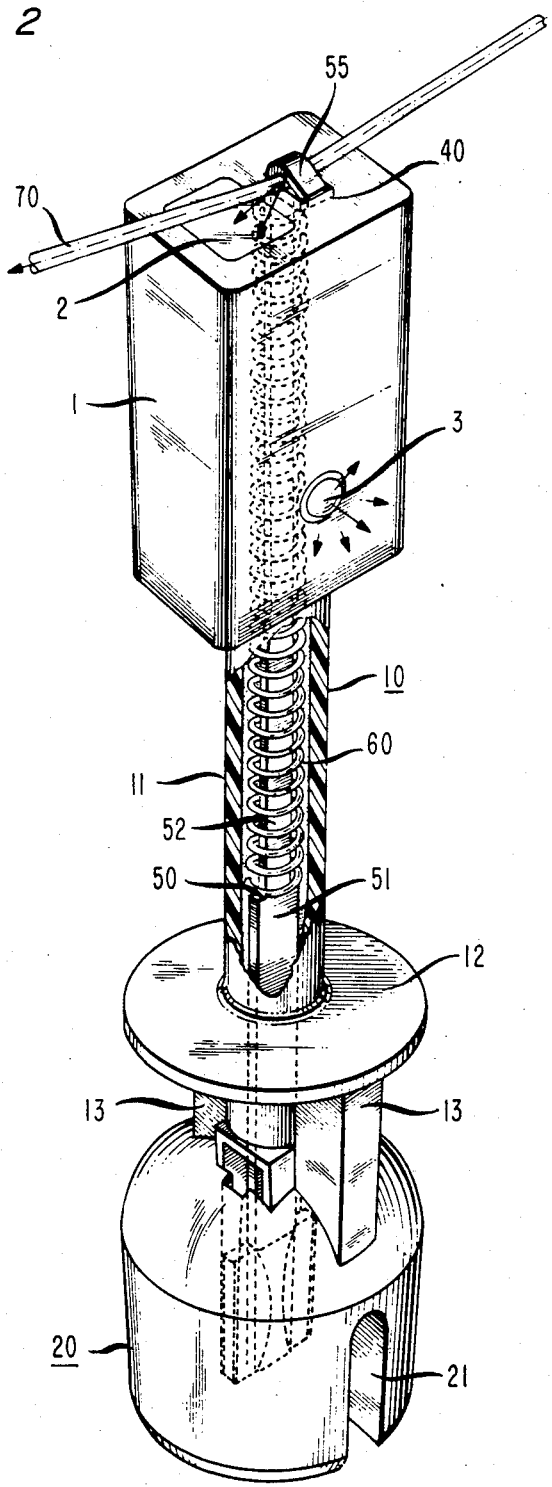
FIG. 2 is an enlarged view of the test clip set forth in FIG. 1 wherein the test clip is engaged with an optical fiber.

To engage the device with an optical fiber, an annular flange 12 is provided to be grasped with the fingers of one hand and forced in the direction of cap 20. This action compresses spring 60 so that hook 55 of shaft 50 extends a short distance away from face 5 of housing end 1. As shown in FIG. 2, once an optical fiber 70 is engaged between hook 5 and face 5 across photodetector 2, the annular flange 12 may be released. Spring 60 will urge housing end 1 toward hook 55, thereby causing microbending of the optical fiber 70. If any light signals are propagating through the optical fiber 70, this microbending will cause some of the light to escape from the fiber core to its cladding and then through the outer surrounding plastic jacket or coating. The actual geometry of the microbend will determine exactly how much light will escape.

Figure 3:
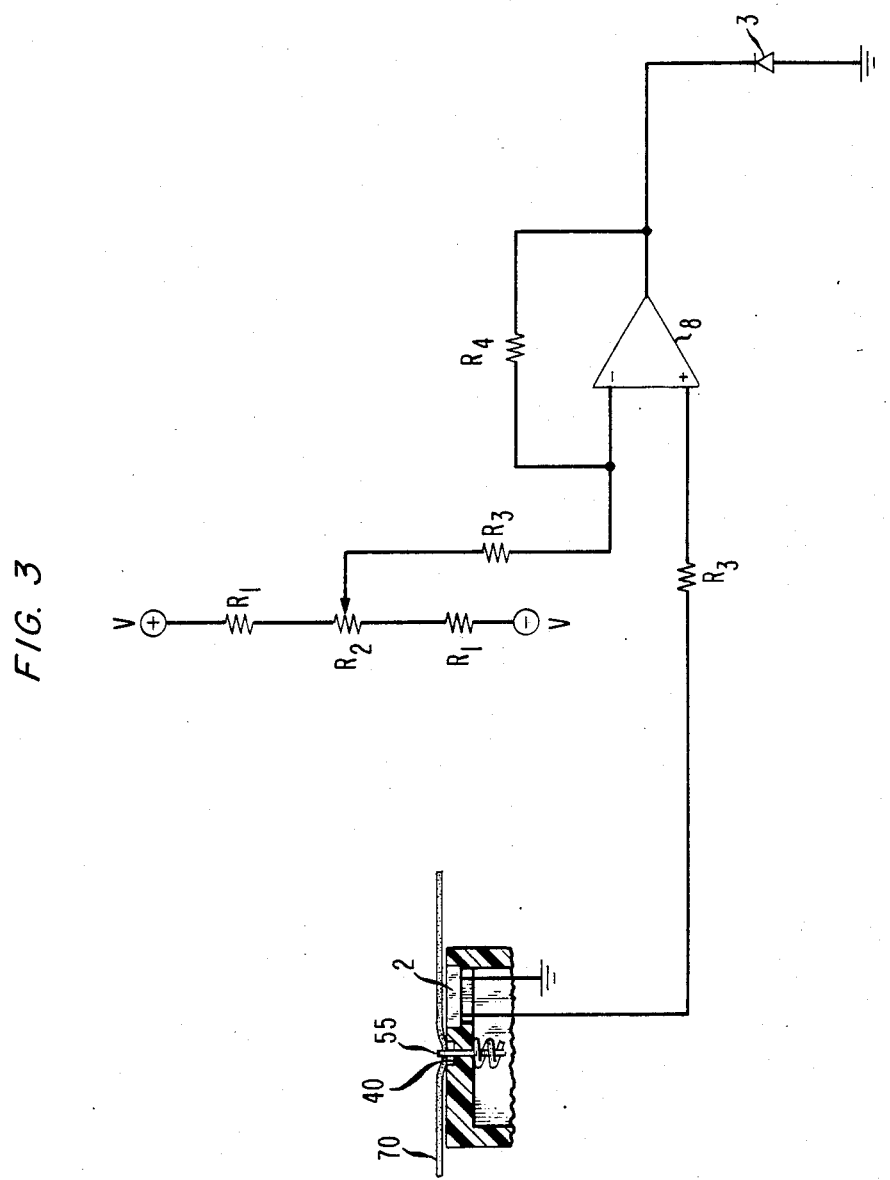
FIG. 3 is a diagram of the detection circuitry of the test clip.

Housing end 1 contains the detection and output circuitry of the test clip. As shown in FIG. 2, an optical fiber 70 is laid across photodetector 2, and then engaged with hook 55, thereby causing microbending of the fiber. Photodetector 2 will detect light which escapes from the fiber core as a result of the microbending of the fiber. As shown in FIG. 3, when photodetector 2 detects light escaping from fiber 70, a signal is sent through operational amplifier 8, which is biased with predetermined gain, and the amplified signal then activates light emitting diode (LED) 3. This output LED can be replaced or enhanced by an audible signal which is provided by, for example, a buzzer (not shown). This would provide additional confirmation of a signal's presence.

The described embodiment provides a device which is easily assembled and easily utilized. This device provides a method for determining the presence of light signals on optical fibers which is non-invasive and requires no modification of the optical fiber or the system being tested.

Figure 4:
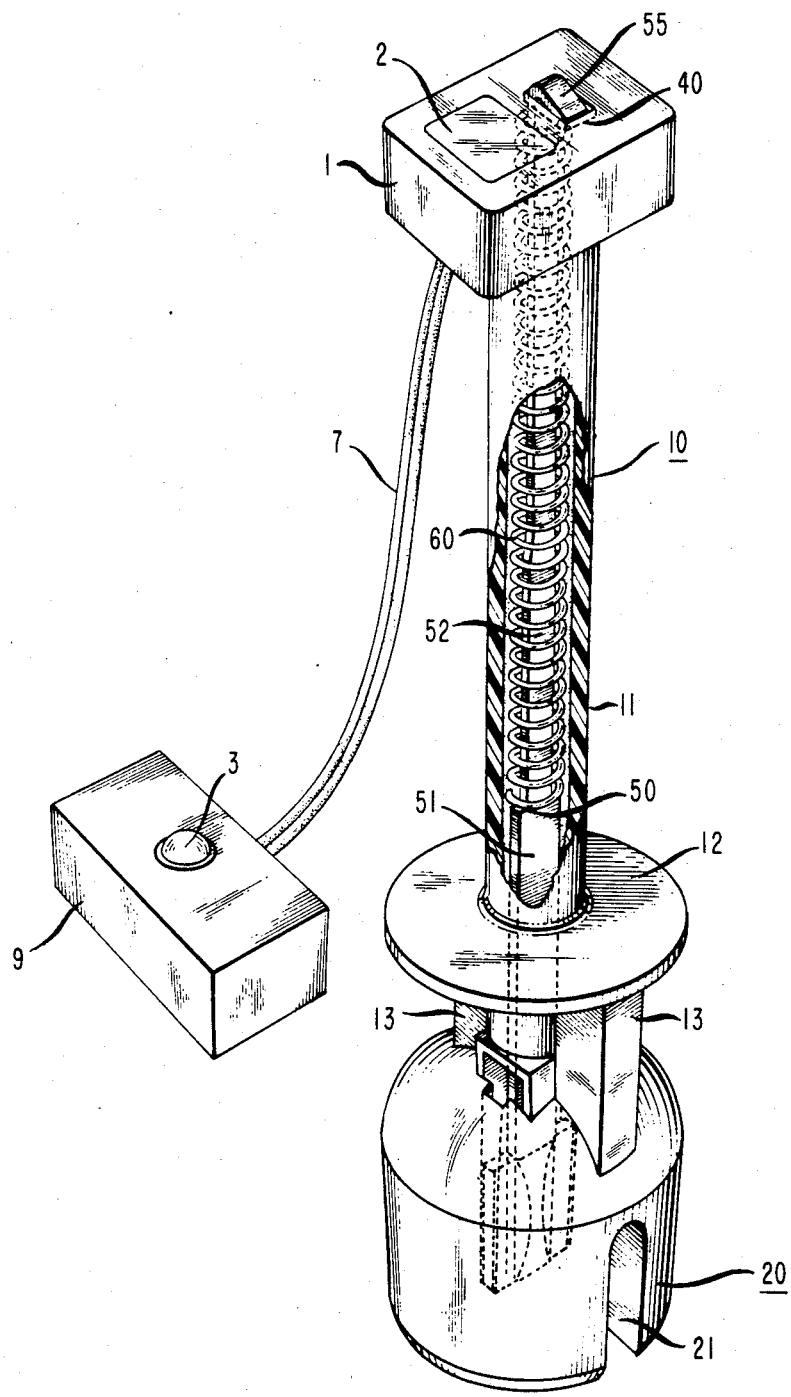
FIG. 4 is an enlarged view of a variation of the test clip showing separate housing for the output circuitry.

The test clip device can also be modified to provide a separate housing for the output circuitry. As shown in FIG. 4, housing end 1 is reduced in size and contains only the detection circuitry, photodetector 2, in addition to hook 55. Lead 7 provides electrical connection between photodetector 2 and the output circuitry, including LED 3, which is contained in a separate housing 9.

Figure 5:
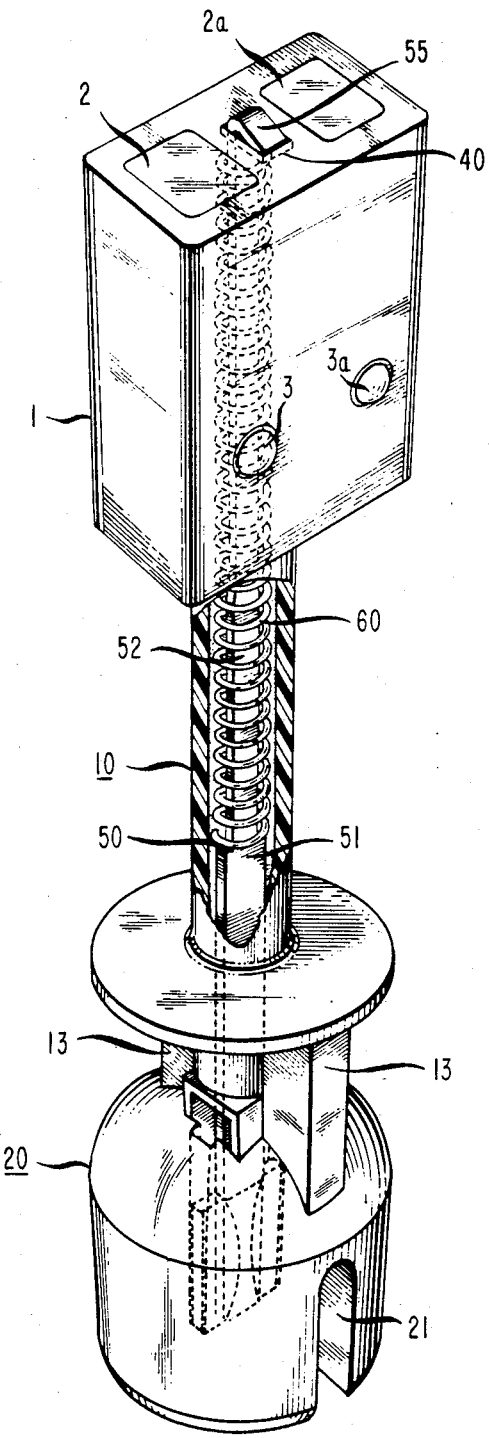
FIG. 5 is an enlarged view of a variation of the test clip showing two photodetectors.

Another embodiment of the invention, where an additional photodetector 2a is included, is shown in FIG. 5. The method of operation in this case is the same as described above, except that the optical fiber is now placed over both photodetectors 2 and 2a. Photodetectors 2 and 2a are connected to output LEDs 3 and 3a, respectively. When hook 55 engages with the optical fiber, a microbend is produced. During microbending, light will scatter in the direction of signal transmission. Thus, depending on whether light is detected by photodetector 2 or photodetector 2a, either LED 3 or LED 3a will be activated accordingly. Used in this manner, the test clip of FIG. 5 will indicate not only the presence of a light signal on an optical fiber, but also the direction in which the signal is being transmitted.

In addition to indicating a light signal's presence and direction of transmission, the test clip can be further modified to indicate the strength of the light signal being transmitted through an optical fiber. A simple indication of signal strength can be done by visually inspecting the intensity of the LED of the output circuitry. Another way to indicate a level of signal strength is to set a threshold beyond which the LED will be activated. Alternatively, the output circuitry of the test clip can be rearranged such that the LED is replaced by a meter that will measure the current which the detected signal generates in the photodetector.

The above-described embodiments of the invention offer several advantages in testing for light signals on optical fibers. The test clip device is easy to use, is very small in size, requires no modification of the fiber to be tested, and presents no disruption to the optical system. It should be realized that it is entirely possible to vary or modify the device illustrated herein without departing from the scope and spirit of the claimed invention.

What is claimed is:

1. A device for testing for signals on an optical fiber comprising
   a housing;
   a shaft having first and second ends, longitudinally reciprocable in said housing;
   a hook portion on said first end of said shaft;
   means limiting sliding movement of said shaft such that said second end is at all times within said housing and said hook portion is movable from a position close to an end of said housing to a position removed a short distance therefrom;

spring means in said housing for biasing said hook portion of said shaft to the position close to an end of said housing;

operating means for moving said shaft such that said hook portion is at the position removed a short distance from said housing thereby engaging said hook portion with an optical fiber and introducing microbending of said fiber when said spring means is operative upon said shaft;

means within said housing for detecting the presence of light emitted in the proximity of said microbending; and means responsive to said means for detecting for indicating when a light signal has been detected.

2. The device of claim 1 wherein said means for detecting comprises at least one photodetector.

3. The device of claim 2 wherein said means for indicating comprises an operational amplifier having an input coupled to said means for detecting, and a light emitting diode, said light emitting diode being triggered by said operational amplifier.

4. The device of claim 1 wherein said means for indicating is located external to said housing.

5. The device of claim 1 wherein said means for detecting comprises means for determining direction of a signal on said optical fiber.

6. The device of claim 5 wherein said means for determining direction comprises first and second photodetectors located at an end of said housing and separated by said hook portion of said shaft, and said means for indicating comprises first and second light emitting diodes responsive to said first and second photodetectors, respectively.

7. The device of claim 1 wherein said means for indicating includes means for denoting strength of said light signal.

8. The device of claim 7 wherein said means for denoting comprises a meter.

* * * * *